(12) United States Patent  
Sperlongano et al.

(10) Patent No.: US 7,865,836 B1  
(45) Date of Patent: Jan. 4, 2011

(54) GEOSPATIAL PRIORITIZED DATA ACQUISITION ANALYSIS AND PRESENTATION

(75) Inventors: Brian M. Sperlongano, Newport, RI (US); Bruce W. Stevens, North Kingstown, RI (US); Daniel P. Juttelstad, North Dartmouth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 829 days.

(21) Appl. No.: 11/829,547

(22) Filed: Jul. 27, 2007

(51) Int. Cl.
*G06F 3/00* (2006.01)
*G06F 3/14* (2006.01)

(52) U.S. Cl. .................. 715/771; 715/835; 715/848; 715/765; 701/200

(58) Field of Classification Search ............... 715/700, 715/764, 765, 771, 781, 835, 846, 848, 961; 701/200
See application file for complete search history.

(56) References Cited

U.S. PATENT DOCUMENTS

| | | | |
|---|---|---|---|
| 3,971,018 A | 7/1976 | Isbister et al. | |
| 4,700,306 A | 10/1987 | Wallmander | |
| 5,633,644 A | 5/1997 | Schussler et al. | |
| 5,754,429 A | 5/1998 | Ishihara et al. | |
| 6,249,241 B1 | 6/2001 | Jordan et al. | |
| 6,658,349 B2 | 12/2003 | Cline | |
| 6,845,318 B1 | 1/2005 | Moore et al. | |
| 2003/0209631 A1* | 11/2003 | Harding et al. | 244/3.15 |
| 2005/0174235 A1* | 8/2005 | Davis et al. | 340/539.13 |

FOREIGN PATENT DOCUMENTS

| | | | |
|---|---|---|---|
| EP | 0411309 A1 | * | 6/1990 |
| FR | 2875613 | * | 9/2004 |

* cited by examiner

*Primary Examiner*—X. L Bautista
(74) *Attorney, Agent, or Firm*—James M. Kasischke; Jean-Paul A. Nasser; Michael P. Stanley

(57) ABSTRACT

The invention as disclosed is a method to identify and monitor/track ships as they traverse waterways. The earth's surface is partitioned into geospatial regions with attributes of each region being stored. A priority is assigned to each partitioned region. A variety of data sources are used to collect data about ships in the geospatial regions. The data is merged and presented in geospatial or tabular formats on a graphical user interface, where the data itself, the data accuracy, and the age of the data can be visually determined graphically and chromatically from the display.

8 Claims, 3 Drawing Sheets

GEOSPATIAL PRIORITIZED DATA ACQUISITION ANALYSIS AND PRESENTATION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to a method to efficiently identify, monitor and track commercial ships that traverse local and international waterways. In particular, the present invention is directed to a method of acquiring non-real time existing information about individual commercial ships from dispersed external data sources and then processing and displaying the information graphically on an electronic display such as a computer monitor.

(2) Description of the Prior Art

There is a recognized need in the United States to share data and information between various government, civilian and industrial organizations for the purposes of providing for Anti-Terrorism/Force Protection/Homeland Security (AT/FP/HLS). One aspect of AT/FP/HLS pertains to the sharing of data and information on maritime activities. U.S. naval and maritime assets are vulnerable to terrorist attack throughout the world. In addition, the U.S. homeland is vulnerable because of its approximately 95,000 miles of coastline and via its approximately 361 ports, especially those ports related to commerce through merchant shipping.

There are a significant number of commercial ships that are constantly traversing global waterways, on the order of tens of thousands. Many of these ships could present a potential threat to U.S. security at the hands of terrorists. Presently there is no efficient method of identifying and tracking these ships to monitor their activities and determine potential threats. Consequently, most of these ships continue to ply the waterways "off the radar" of U.S. scrutiny.

Existing information sources from various government, civilian and industrial organizations such as government agencies like the Department of Defense (the Office of Naval Intelligence) and the Coast Guard (the Automated Identification System) and private insurance companies (Lloyd's of London), can provide identity, location and other data for individual commercial ships. These diverse information sources are independently organized in a large number of disparate locations. Existing capabilities to collect, aggregate, align and analyze data across the wide spectrum of information sources are manual, labor-intensive, time-consuming, error-prone and do not provide a meaningful visual perspective.

Prior art systems do not encompass the global scale that is necessary to accomplish the AT/FP/HLS goals. For example U.S. Pat. No. 6,249,241 to Jordan et al. describes a marine vessel tracking system that is directed to a specific harbor. The system collects data from a single data source, namely harbor radar. It fails to consider other data regarding any vessel type from any geospatial data source at any geospatial location, not just a specific harbor radar system.

What is needed is a method to efficiently acquire the aforementioned identity, location and other types of data and then align, aggregate, correlate and visualize the data all through computer-automated means, in a timely fashion providing a global as well as local display of commercial shipping activity with the capacity of highlighting individual ships of interest that could pose a threat of potential terrorism.

SUMMARY OF THE INVENTION

It is a general purpose and object of the present invention to perform continuous efficient data acquisition from multiple disparate sources to obtain information on commercial ships.

It is a further object of the present invention to process the aforesaid information on commercial ships to provide a global as well as local display of commercial shipping activity.

The above objects are accomplished with the present invention by a method to identify and monitor/track ships as they traverse waterways through the use of a networked computer and disparate external data sources. The earth's surface is partitioned into geospatial regions with attributes of each region being stored. A priority is assigned to each partitioned region. A variety of data sources are used to collect data about ships in the geospatial regions. The data is merged and presented in geospatial or tabular formats on a graphical user interface, where the data itself, the data accuracy, and the age of the data can be visually determined graphically and chromatically from the display.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION

Figure 1:
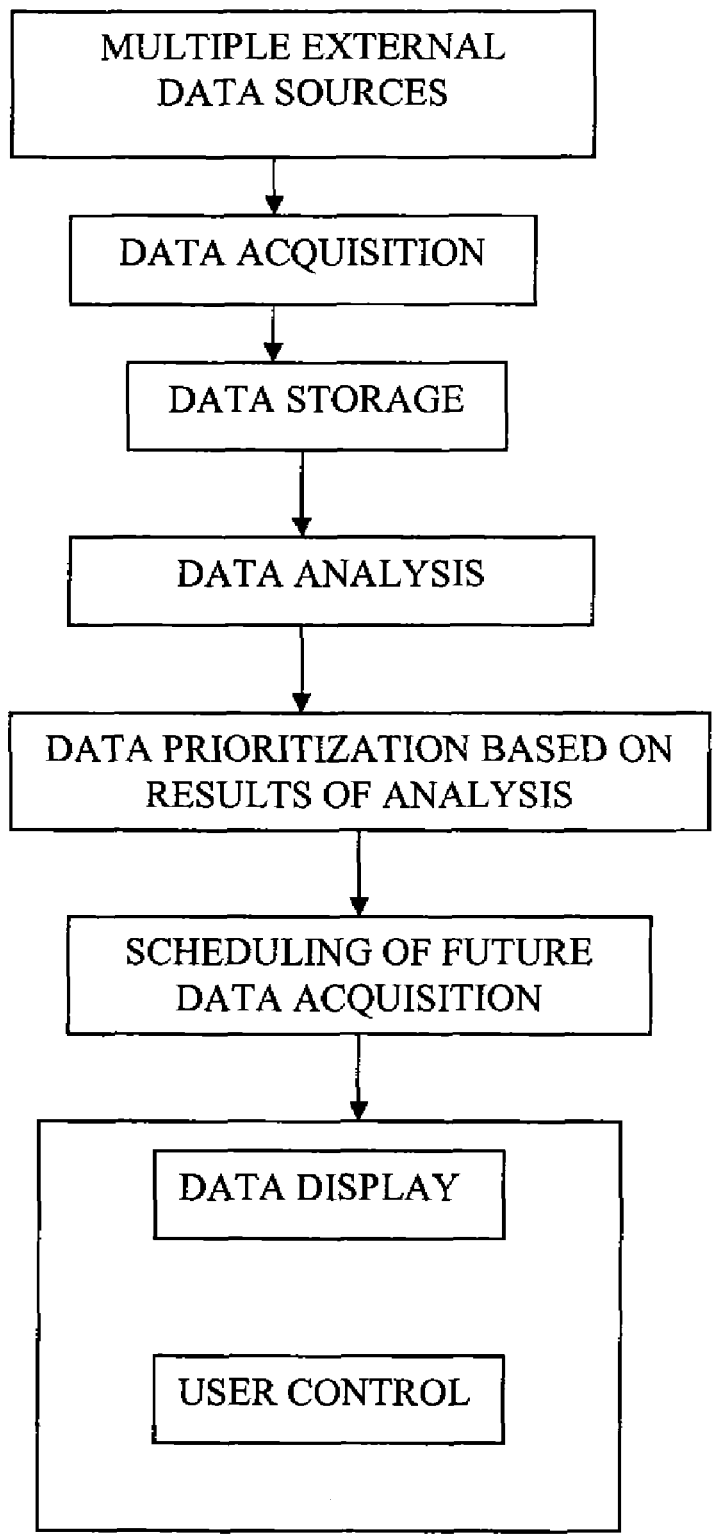
FIG. 1 is a block diagram of the system components including the, the data processor, and the user interface.

Referring initially to FIG. 1, at the highest level, the disclosed method performs continuous data acquisition 12 from multiple disparate external data sources 10. These multiple disparate external data sources 10 are existing information sources such as networked databases from various government, civilian and industrial organizations that can provide identity, location and other data for individual commercial marine vessels. The data is stored 14 and then an analysis is performed whereby the data is organized 18 according to an assigned priority. Future data acquisition is scheduled 20. The results of the analysis are presented in various formats through a graphical user interface 22 that allows a user to filter the displayed data and choose various formats for the display, and control the data acquisition schedule.

Figure 2:
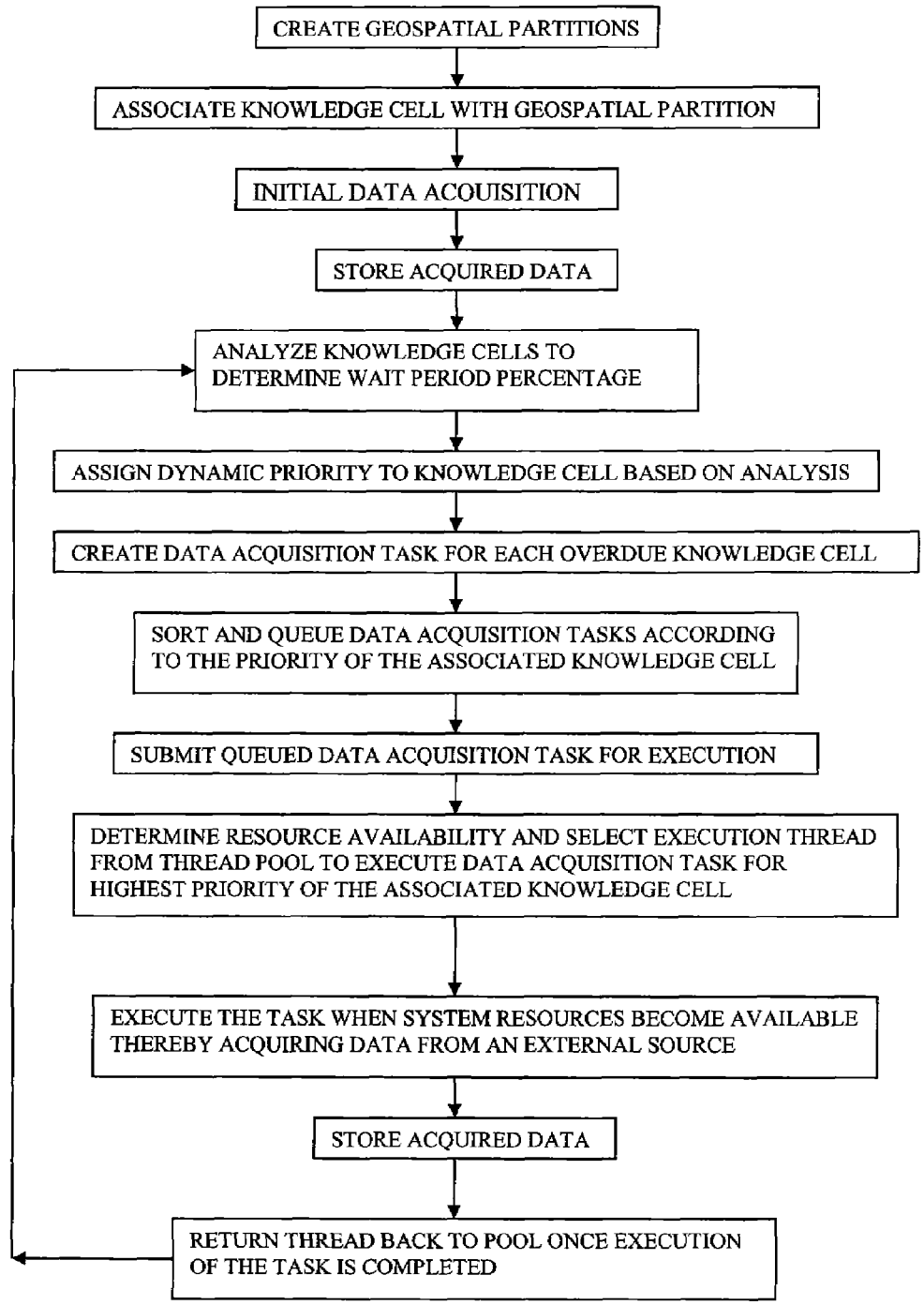
FIG. 2 is a flow diagram of the method for acquiring data used in the system.

Referring to FIG. 2 there is illustrated a flow diagram of the method of data source acquisition. The first step of the method 24 is to divide the surface area of the globe into geospatial partitions 25 of equal size. The partition size is selected to conform to a desired granularity of display and processing. The next step 26 is to associate a knowledge cell 27 to each geospatial partition 25. The knowledge cell 27 is used to store physical attributes 29 and statistical attributes 31 of the associated geospatial partition that are acquired from multiple disparate external data sources 10. Physical attributes 29 describe location, size, and shape of the partition. Statistical attributes 31 are used to describe partition features such as data acquisition age (the period of time passed since the acquisition of data from an external source), geospatial area of interest, activity density and contained vessels.

The next step 28 is to make an initial acquisition of data pertaining to physical attributes 29 and statistical attributes 31. As data from external data sources 10 is acquired for each knowledge cell 27, the data is persistently stored 30. The physical attributes 27 and statistical attributes 31 acquired from the external data sources 10 are analyzed 32 for each knowledge cell 27 in order to prioritize subsequent re-acquisition of data for each knowledge cell 27. As each knowledge cell 27 is updated with new data gathered from external data sources 10, the rate that the new data is obtained is tracked and examined to determine the minimum length of time to wait (wait period) before re-acquiring data for that knowledge cell 32. The wait period is inversely related to the incoming data rate, so knowledge cells that have a higher rate of data are updated more frequently but for shorter time intervals. Once the wait period has been exceeded for a particular knowledge cell, it is considered to be overdue. A dynamic priority is assigned 34 to each knowledge cell 27 based on analysis of the percentage of time by which the wait period has been exceeded for the knowledge cell 27. For example, knowledge cell 27 with a twenty minute wait period that is ten minutes overdue (i.e. fifty percent of the wait period) is assigned higher dynamic priority than a knowledge cell 27 with a one hour wait period which is twelve minutes overdue (i.e. twenty percent of the wait period).

Overdue knowledge cells 27 are an indication that new data pertaining to the associated geospatial partition 25 needs to be acquired as soon as possible. The actual order of reacquisition of data is done such that the knowledge cells 27 are updated with new data according to a highest dynamic priority first order of each knowledge cell 27.

The next step 36 is to create a data acquisition task for each knowledge cell 27 that has exceeded its wait period. A data acquisition task is a program or function that is specific to a single external data source 10. A data acquisition task gathers geospatial data that lies within specified geospatial boundaries from its specific external data source 10. Data acquisition tasks are automatically sorted and queued in descending order of the dynamic priority of their associated knowledge cell 38. Since the order that each data acquisition task is sorted depends on time, the order of data acquisition tasks in the queue will change over time.

The next step 40 is to submit the queued data acquisition tasks for execution when resources such as the network connections and external data sources become available. When resources are available, the current highest-priority task is submitted to an execution thread 42. An execution thread is a sequence of instructions which may execute in parallel with other execution threads. This parallel execution occurs by time slicing, wherein a single processor switches processing between different threads. The execution thread is used to execute the data acquisition tasks. Multiple execution threads are made available in a thread pool. A thread pool is simply a collection of execution threads. The size of the thread pool is set to the maximum number of simultaneous data gathering operations which is allowed by the external source. Once an execution thread has completed executing a data acquisition task it returns to the thread pool and is made available for use for the next pending data acquisition task 48.

In the next step a data acquisition task is executed 44 and data is acquired from one or more external data sources 10. In the next step the acquired data is merged into local data storage 46. The exact nature of the data acquisition task is specific to the type of external data source being accessed and the means for accessing the source. For example the type and means may include accessing a database or file via a wide area or local area network. This allows the prioritized data acquisition algorithm to be independent of the actual method by which the data is acquired. Data corresponding to a single vessel is collected over time providing a time-stamped historical position history, which lists the time and location for all data collected about the vessel. Attributes are updated for the associated knowledge cell 27. Steps 32 through 48 are repeated in a continuous loop, thereby maintaining a constantly updated system.

Figure 3:
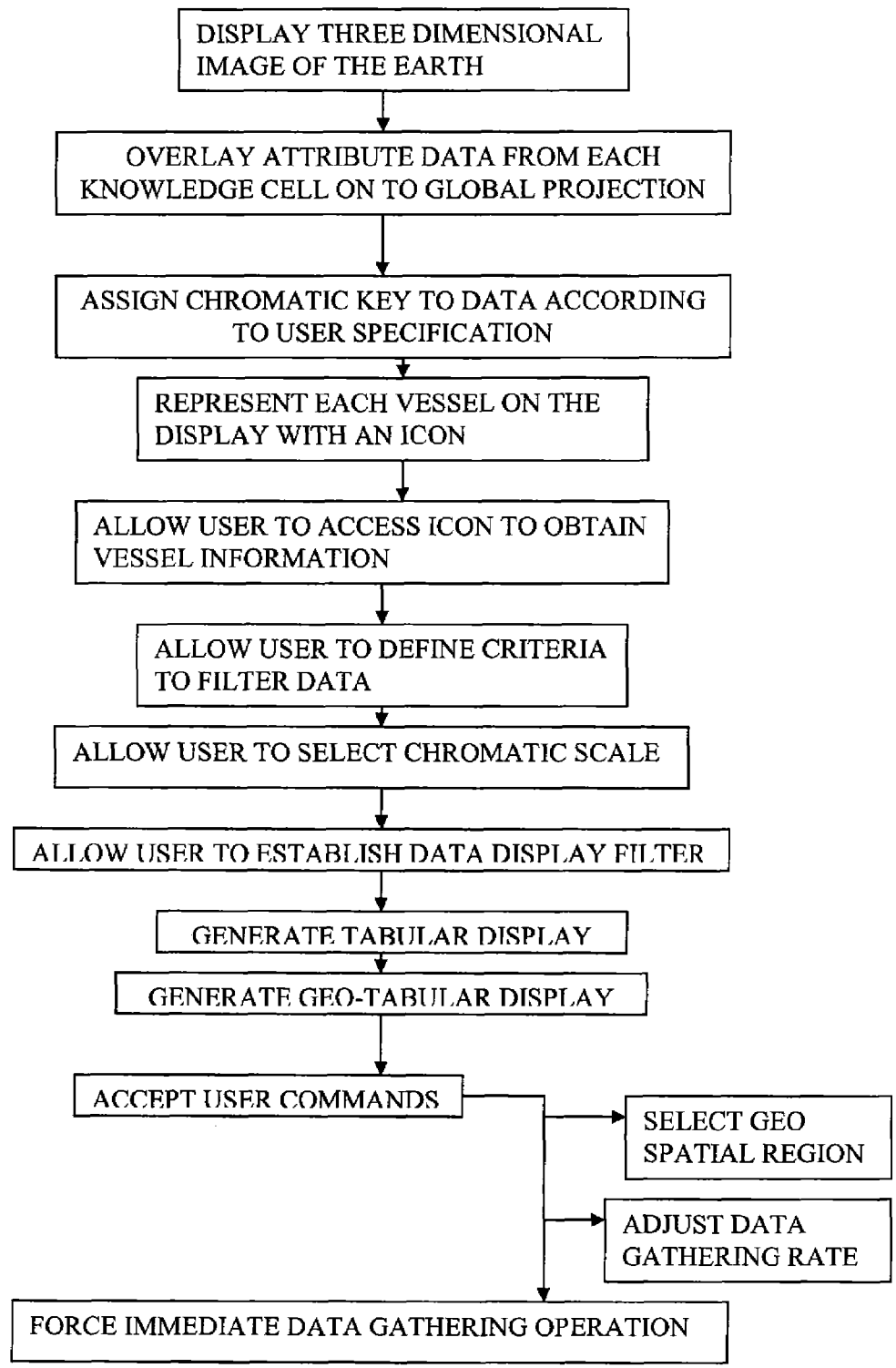
FIG. 3 is flow diagram of the graphical user interface.

Referring to FIG. 3 there is illustrated the flow diagram of the method for the graphical user interface. In the first step 50, each geospatial partition 25 is displayed on the graphical user interface 22 as a specific section of the earth's surface using a three dimensional projection of the planet. In the next step 52, the physical attributes 29 and statistical attributes 31 of the knowledge cell 27 of the associated geospatial partition 25 are also displayed on the graphical user interface by overlaying the attributes' information over the three dimensional projection of the earth. This results in a display of discrete geospatial data that is then continuously collected and refreshed as data is acquired from external sources. The next step 54 is to assign a chromatic key to the displayed knowledge cell data so as to highlight particular attributes including the data accuracy and the age of the data, which allows the user to graphically determine the attributes as displayed using the chromatic key. For example, a display depicting vessel traffic densities might indicate a color ranging from blue to red, with a number in each partition. The number and color indicates the relative number of vessels present in the partition, with blue indicating a partition with little activity and red indicating a partition with heavy traffic. The next step 56 is to represent each vessel within a geospatial partition 25 as displayed with an icon indicating the position of the vessel within each geospatial partition 25. The next step 58 is to allow the user to obtain additional information about the vessel by accessing the displayed icon through the user interface. For example the user can point to the icon and click on it to obtain specific information about the vessel. The next step 60 is to provide the user the opportunity to define criteria to filter the data and attributes through the graphical user interface 22. The next step 62 is to allow the user to choose from a variety of chromatic scales associated with a criteria, and can select the data that is being displayed in a particular color. For example, a user might choose a criterion of data acquisition age, which would display a map indicating which geospatial areas are out of date displayed on the GUI in the color yellow. The next step 64 is to provide the user with control selections to establish data display filter characteristics through the graphical user interface 22. For example, a user may wish to only display vessels which fly the flag of a certain country. In that case, only those vessels' icons would be visible on the display, and any related color-coding would be updated to reflect the new filtered view. The GUI presents information in a variety of display formats including the geospatial display described above. In addition, attribute data can be displayed in tabular and geo-tabular formats to suit the needs of the user. The geo-tabular format represents information that is specific to geospatial partitions. In step 66, attribute data is displayed in tabular format in tables. In step 68, attribute data is displayed in geo-tabular format in tables and cells which correspond to each geospatial partition's geographic location. In step 70, user commands and adjustable parameters are accepted through the graphical user interface. The user interface provided allows the user to select individual geospatial regions as illustrated in step 72 and manually adjust their data gathering rate to override the automatic data acquisition task priority ordering as illustrated in step 74. In the final step 76 the user is provided a means to select an individual geospatial region to force an immediate data gathering operation on that region.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover, all such modifications and embodiments, which would come within the spirit and scope of the present invention.

What is claimed is:

1. A method of employing a networked computer to acquire analyze and present data related to marine vessels that are located throughout all global waterways, comprising:

establishing a plurality of geospatial partitions corresponding to specific areas of the surface of the earth;

associating a knowledge cell with each of said plurality of geospatial partitions;

acquiring data related to marine vessels, wherein said vessels are located in said plurality of geospatial partitions, wherein said data is acquired from a plurality of external networked data sources;

storing said acquired data related to marine vessels in said associated knowledge cells;

analyzing each knowledge cell to determine a wait period percentage for each knowledge cell;

assigning a dynamic priority to each knowledge cell based on the wait period percentage for each knowledge cell, wherein the higher the wait period percentage for each knowledge cell then the higher the dynamic priority of each knowledge cell;

creating a data acquisition task for each knowledge cell;

sorting each data acquisition task according the dynamic priority of its associated knowledge cell;

queuing each data acquisition task in the order in which each data acquisition task was sorted;

selecting an execution thread from a thread pool to execute the data acquisition task for the associated knowledge cell with the highest dynamic priority;

executing the data acquisition task through said execution thread for the associated knowledge cell with the highest dynamic priority thereby acquiring the most recent available data related to marine vessels for said knowledge cell;

storing said most current available acquired data related to marine vessels in said knowledge cells;

returning said execution thread to said thread pool;

displaying the data contained in each knowledge cell on a graphical user interface; and repeating the previous nine steps in order to continuously acquire the most current available data for each knowledge cell.

2. The method of claim 1 wherein the step of displaying the data contained in each knowledge cell on a graphical user interface further comprising the steps of:

displaying three dimensional image of the earth;

overlaying data related to marine vessels in said knowledge cells on the three dimensional image of the earth;

assigning a chromatic key to said overlaid data related to marine vessels according to a user provided specification;

representing each marine vessel on said three dimensional image of the earth with an icon;

allowing a user to access said icon to obtain data related to marine vessels that is specific to the marine vessel associated with said icon;

allowing a user to define a criteria to filter said data related to marine vessels;

allowing a user to select a chromatic scale for said chromatic key to said overlaid data related to marine vessels;

generating a tabular display of said data related to marine vessels;

generating a geo-tabular display of said data related to marine vessels;

accepting a user command to select a geo spatial partition;

accepting a user command to adjust a rate of data gathering in a geo-spatial partition; and accepting a user command to force an immediate data gathering operation.

3. The method of claim 1 wherein said plurality of geospatial partitions are of equal size.

4. The method of claim 1 wherein each of said knowledge cells contain a plurality of physical attributes and statistical attributes, wherein physical attributes describe the location, size, and shape of a geo-spatial partition, and wherein statistical attributes describe a period of time passed since the acquisition of data related to marine vessels from an external source, a geospatial area of interest, an activity density and the number of marine vessels in a particular geo-spatial partition.

5. The method of claim 1 wherein said external networked data sources consist of existing information sources such as networked databases from various government, civilian and industrial organizations that can provide identity, location and other data for individual commercial marine vessels.

6. The method of claim 1 wherein said wait period percentage for each knowledge cell is based on a wait period being a minimum length of time to wait before re-acquiring data for a particular knowledge cell, wherein the wait period is inversely related to an incoming data rate, so knowledge cells that have a higher incoming data rate are updated more frequently but for shorter time intervals, wherein the time by which the wait period has been exceeded for a particular knowledge cell is calculated as percentage of the wait period.

7. The method of claim 1 wherein said data acquisition task is a program or function that is specific to a single external networked data source, wherein said data acquisition task gathers geospatial data that lies within specified geospatial boundaries from its specific external networked data source, wherein the exact nature of the data acquisition task is specific to the type of external networked data source being accessed and the means for accessing it.

8. The method of claim 1 wherein the step of executing the data acquisition task through said execution thread for the associated knowledge cell with the highest dynamic priority comprises executing a sequence of instructions in parallel with other execution threads by time slicing, wherein a single processor switches processing between different execution threads.

* * * * *